(12) United States Patent
Nguyen et al.

(10) Patent No.: US 10,544,672 B2
(45) Date of Patent: Jan. 28, 2020

(54) HIGH-EFFICIENCY DOWNHOLE WIRELESS COMMUNICATION

(71) Applicant: HALLIBURTON ENERGY SERVICES, INC., Houston, TX (US)

(72) Inventors: Quang Huy Nguyen, Singapore (SG); Wei Hsuan Huang, Singapore (SG); Jin Ma, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 224 days.

(21) Appl. No.: 15/518,446

(22) PCT Filed: Dec. 18, 2014

(86) PCT No.: PCT/US2014/071112
§ 371 (c)(1),
(2) Date: Apr. 11, 2017

(87) PCT Pub. No.: WO2016/099505
PCT Pub. Date: Jun. 23, 2016

(65) Prior Publication Data
US 2017/0321542 A1    Nov. 9, 2017

(51) Int. Cl.
*E21B 47/12* (2012.01)
*E21B 47/18* (2012.01)
*G05B 19/10* (2006.01)

(52) U.S. Cl.
CPC .......... *E21B 47/122* (2013.01); *E21B 47/12* (2013.01); *E21B 47/18* (2013.01); *G05B 19/108* (2013.01)

(58) Field of Classification Search
CPC ........ E21B 47/12; E21B 47/122; E21B 47/18; G05B 19/108
See application file for complete search history.

(56) References Cited

U.S. PATENT DOCUMENTS 4,015,234 A  3/1977  Krebs
4,051,897 A  10/1977  Kingelin et al.
(Continued)

FOREIGN PATENT DOCUMENTS

CA  2900098  8/2014
GB  2529845  3/2016
(Continued)

OTHER PUBLICATIONS

Halliburton Energy Services, Geo-Pilot® GXT Rotary Steerable System, available at http://www.halliburton.com/en-US/ps/sperry/drilling/directional-drilling/rotary-steerables/geo-pilot-gxt-rotary-steerable-system.page, retrieved on Jul. 2, 2014, 1 page.
(Continued)

*Primary Examiner* — Caroline N Butcher
(74) *Attorney, Agent, or Firm* — Kilpatrick Townsend & Stockton LLP

(57) ABSTRACT

A communication system for use with a well tool can include an of outer toroid antenna. The outer toroid antenna can be positionable around an outer housing of the well tool. The communication system can also include an inner toroid antenna positionable within the outer housing of the well tool. The communication system can further include a switch coupled to the outer toroid antenna and the inner toroid antenna. The switch can be operable to enable or disable a wireless communication via the outer toroid antenna or the inner toroid antenna.

22 Claims, 5 Drawing Sheets

(56) References Cited

U.S. PATENT DOCUMENTS

| | | |
|---|---|---|
| 4,693,534 A | 9/1987 | Clark et al. |
| 4,712,070 A | 12/1987 | Clark et al. |
| 4,766,442 A | 8/1988 | Issenmann |
| 4,770,034 A | 9/1988 | Titchener et al. |
| 4,785,247 A | 11/1988 | Meador et al. |
| 5,160,925 A | 11/1992 | Dailey et al. |
| 5,339,037 A | 8/1994 | Bonner et al. |
| 5,359,324 A | 10/1994 | Clark et al. |
| 5,394,141 A | 2/1995 | Soulier |
| 6,064,210 A | 5/2000 | Sinclair et al. |
| 6,392,561 B1 | 5/2002 | Davies et al. |
| 6,577,244 B1 | 6/2003 | Clark et al. |
| 6,926,098 B2 | 8/2005 | Peter |
| 7,098,802 B2 | 8/2006 | Hall et al. |
| 7,252,160 B2 | 8/2007 | Dopf et al. |
| 7,277,026 B2 | 10/2007 | Hall et al. |
| 7,303,007 B2 | 12/2007 | Konschuh et al. |
| 7,518,528 B2 | 4/2009 | Price et al. |
| 7,557,582 B2 | 7/2009 | Moore et al. |
| 7,565,936 B2 | 7/2009 | Toffolo et al. |
| 7,566,235 B2 | 7/2009 | Bottos et al. |
| 7,605,716 B2 | 10/2009 | Peter et al. |
| 7,730,968 B2 | 6/2010 | Hosie et al. |
| 8,011,425 B2 | 9/2011 | Konschuh et al. |
| 8,031,081 B2 | 10/2011 | Pisoni et al. |
| 8,102,276 B2 | 1/2012 | Sugiura |
| 8,242,928 B2 | 8/2012 | Prammer |
| 8,258,976 B2 | 9/2012 | Price et al. |
| 8,570,045 B2 | 10/2013 | Tchakarov et al. |
| 8,648,733 B2 | 2/2014 | Dopf et al. |
| 2003/0137301 A1* | 7/2003 | Thompson ............ G01V 3/30 324/338 |
| 2004/0113808 A1 | 6/2004 | Hall et al. |
| 2005/0087368 A1 | 4/2005 | Boyle et al. |
| 2005/0218898 A1 | 10/2005 | Fredette et al. |
| 2006/0000604 A1 | 1/2006 | Jenkins et al. |
| 2006/0151179 A1 | 7/2006 | Boyadjieff et al. |
| 2008/0253228 A1 | 10/2008 | Camwell et al. |
| 2009/0045974 A1 | 2/2009 | Patel |
| 2011/0254695 A1 | 10/2011 | Camwell et al. |
| 2012/0160473 A1 | 6/2012 | Sihler |
| 2012/0199730 A1 | 8/2012 | Chirovsky et al. |
| 2012/0299743 A1 | 11/2012 | Price et al. |
| 2013/0088364 A1 | 4/2013 | Bittar et al. |
| 2013/0113487 A1 | 5/2013 | Bittar et al. |
| 2013/0319767 A1 | 12/2013 | Wilson et al. |
| 2014/0132271 A1 | 5/2014 | Liu et al. |
| 2014/0202768 A1* | 7/2014 | Noske .................. E21B 34/06 175/57 |
| 2014/0240141 A1* | 8/2014 | Logan .................. E21B 47/122 340/854.6 |
| 2015/0167452 A1* | 6/2015 | Godager .............. E21B 47/122 340/854.6 |

FOREIGN PATENT DOCUMENTS

| | | |
|---|---|---|
| WO | 2011066624 | 6/2011 |
| WO | 2012003999 | 2/2013 |
| WO | 2014015323 | 1/2014 |
| WO | 2014047543 | 3/2014 |
| WO | 2014071520 | 5/2014 |
| WO | 2014133504 | 9/2014 |
| WO | 2016099505 | 6/2016 |
| WO | 2016108811 | 7/2016 |
| WO | 2016108816 | 7/2016 |

OTHER PUBLICATIONS

International Patent Application No. PCT/US2014/071112, International Search Report and Written Opinion, dated Aug. 26, 2015, 15 pages.

International Patent Application No. PCT/US2014/072496, International Search Report and Written Opinion, dated Sep. 1, 2015, 10 pages.

International Patent Application No. PCT/US2014/072507, International Search Report and Written Opinion, dated Sep. 21, 2015, 14 pages.

Reeves et al., "High Speed Acoustic Telemetry Network Enables Real-Time Along String Measurements, Greatly Reducing Drilling Risk", 2011, pp. 12.

Schlumberger Company, "PZIG At-bit inclination and gama ray service", available at http://www.slb.co/~/media/Files/drilling/product_sheets/mwd/pathfinder_mwd/pzig_at_bit_gr_measurements_ps.pdf, retrieved on Apr. 4, 2017, 2 pages.

Scientific Drilling, "Sci-Driver Near Bit Smart Motor", available at http://scientfticdrilling.com/content/uploads/2014/01/Product-Spec-Sheet_LWD_Sci-Driver_Smart-Motor.pdf, retrieved on Apr. 4, 2017, 1 page.

Canadian Application No. CA 2,967,286, "Office Action", Feb. 11, 2019, 5 pages.

\* cited by examiner

HIGH-EFFICIENCY DOWNHOLE WIRELESS COMMUNICATION

CROSS-REFERENCE TO RELATED APPLICATIONS

This is a U.S. national phase under 35 U.S.C. 371 of International Patent Application No. PCT/US2014/071112, titled "High-Efficiency Downhole Wireless Communication" and filed Dec. 18, 2014, the entirety of which is incorporated herein by reference.

TECHNICAL FIELD

The present disclosure relates generally to devices for use in Well systems. More specifically, but not by way of limitation, this disclosure relates to high-efficiency downhole wireless communication.

BACKGROUND

A well system (e.g., an oil or gas well for extracting fluid or gas from a subterranean formation) can include various well tools in a wellbore. For example, the well tools can include a mud motor and a geo-pilot tool. It can be desirable to wirelessly communicate data between the well tools. The power transmission efficiency of a wireless communication, however, can depend on a variety of factors. For example, the power transmission efficiency can depend on the conductivity of fluid in the wellbore and the conductivity of the subterranean formation. It may not be practical or feasible, however, to vary the characteristics of the fluid or the subterranean formation to improve the power transmission efficiency. As another example, the power transmission efficiency can depend on the design of the antennas used to transmit and receive the wireless communications. An antenna design that maximizes the power transmission efficiency in one downhole environment, however, may minimize the power transmission efficiency in another downhole environment. It can be challenging to wirelessly communicate between well tools efficiently.

DETAILED DESCRIPTION

Figure 1:
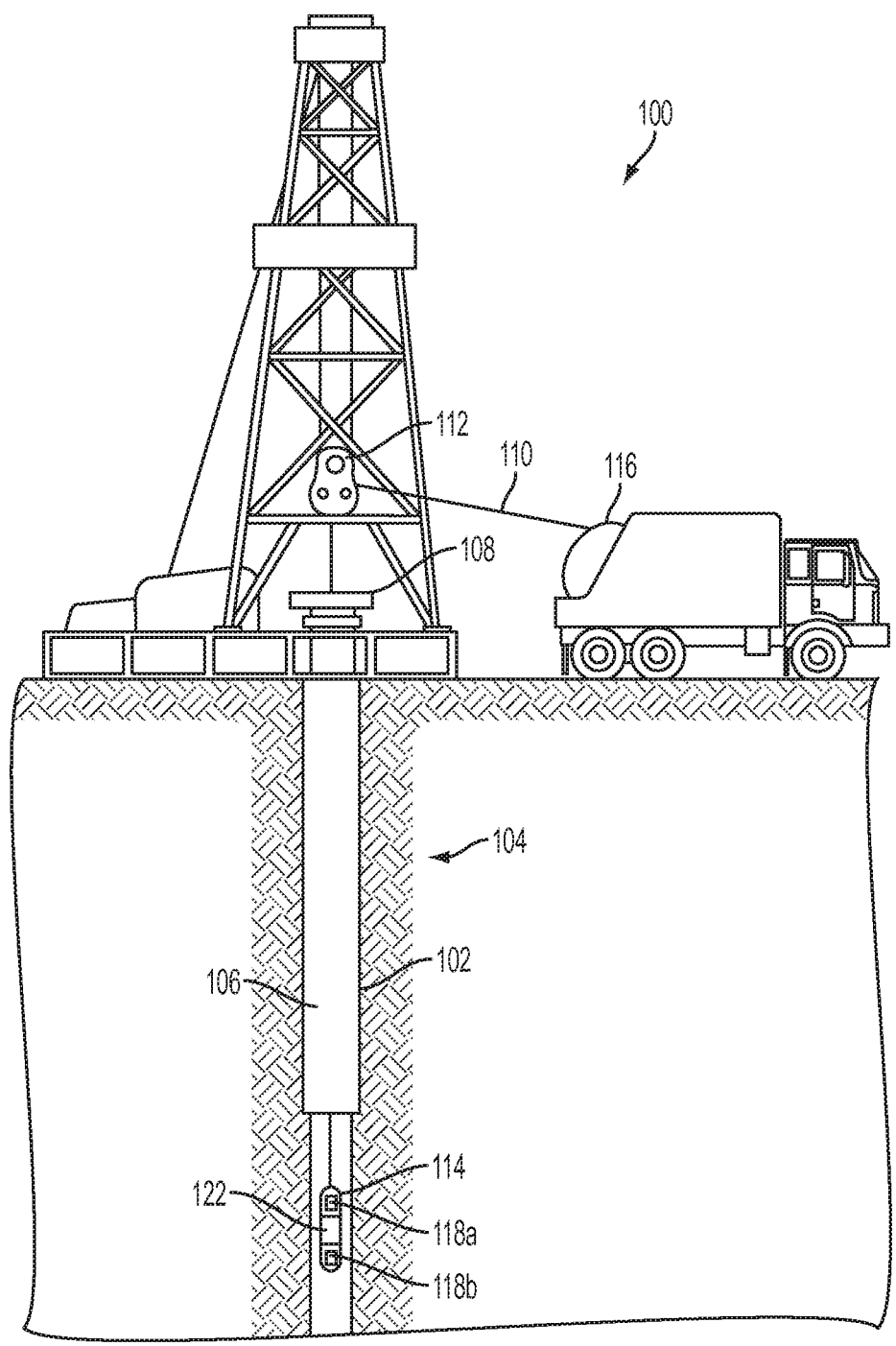
FIG. 1 is a cross-sectional view of an example of a well system that includes a system for high-efficiency downhole wireless communication.

Certain aspects and features of the present disclosure are directed to a communication system for high-efficiency downhole wireless communications. The communication system can include two toroid antennas. A toroid antenna can include a wire coil positioned around (e.g., wrapped around) a donut-shaped core (e.g., a magnetic core). One of the two toroid antennas can have an inner diameter that is positioned around the outer housing of a well tool. This toroid antenna can be an outer toroid antenna. The other toroid antenna can have an inner diameter positioned around the outer circumference of a mandrel within the well tool. This toroid antenna can be an inner toroid antenna. The communication system can communicate wirelessly using the inner toroid antenna, the outer toroid antenna, or both.

In some examples, the communication system can detect the strength (e.g., the voltage, current, or power) of a wireless signal received using the inner toroid antenna. If the strength is below a threshold, the communication system can turn off (e.g., disable wireless communications via) the inner toroid antenna and communicate using the outer toroid antenna. Similarly, the communication system can detect the strength of a wireless signal received using the outer toroid antenna. If the strength is over a threshold, the communication system can turn off the outer toroid antenna and communicate using the inner toroid antenna. By switching between the inner toroid antenna and the outer toroid antenna, the power transmission efficiency of the communication system can be improved (e.g., maximized).

The power transmission efficiency of the communication system can depend on both (i) the conductivity of the transmission path of the wireless signal and (ii) whether an inner toroid antenna or an outer toroid antenna receives the wireless signal. For example, a fluid (e.g., a drilling fluid or mud) can be positioned in the transmission path of wireless signals received by the communication system. If the fluid has a high resistivity (e.g., 100 ohm-m) and the inner toroid antenna is used for communications, the power transmission efficiency can be high (e.g., −52 dB). If the fluid has a low resistivity (e.g., less than 0.5 ohm-m) and the inner toroid antenna is used for communications, however, the power transmission efficiency can be low (e.g., −150 dB). The communication system can detect and compensate for the low power transmission efficiency by disabling communications via the inner toroid antenna and enabling communications via the outer toroid antenna. In some examples, the outer toroid antenna can provide a higher power transmission efficiency (e.g., −100 db) if the fluid has a low resistivity than the inner toroid antenna. Switching to the outer toroid antenna in such cases can improve the power transmission efficiency of the communication system.

Further, if the power transmission efficiency using the outer toroid antenna changes by an amount over a threshold (e.g., increases by 10 dB), which may be indicative of the resistivity of the fluid changing from low to high, the communication system can switch to communicating using the inner toroid antenna. This can improve the power transmission efficiency of the communication system, because the inner toroid antenna can have a higher power efficiency than the outer toroid antenna when the fluid has a high resistivity.

By switching between the inner toroid antenna and the outer toroid antenna, the communication system can dynamically adjust for downhole conditions to improve power transmission efficiency, with minimal to no change to the transmission power of the wireless signals. This is unlike traditional communication systems, which may significantly increase the transmission power of wireless signals to compensate for changing downhole conditions. By significantly increasing the transmission power, traditional communication systems may be less efficient and more expensive to operate.

In some examples, using the inner toroid antenna in conjunction with the outer toroid antenna can provide redundancy. This can allow the communication system to operate if one toroid antenna fails. For example, the communication system can determine that the inner toroid antenna has failed and communicate using only the outer toroid antenna.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a system for high-efficiency downhole wireless communication. The well system 100 includes a wellbore 102 extending through various earth strata. The wellbore 102 extends through a hydrocarbon bearing subterranean formation 104. A casing string 106 extends from the surface 108 to the subterranean formation 104. The casing string 106 can provide a conduit through which formation fluids, such as production fluids produced from the subterranean formation 104, can travel from the wellbore 102 to the surface 108.

The well system 100 can also include at least one well tool 114 (e.g., a formation-testing tool). The well tool 114 can be coupled to a wireline, slickline, or coiled tube 110 that can be deployed into the wellbore 102. The wireline, slickline, or coiled tube 110 can be guided into the wellbore 102 using, for example, using a guide 112 or winch. In some examples, the wireline, slickline, or coiled tube 110 can be wound around a reel 116.

The well tool 114 can include a first communication system 118a and a second communication system 118b. The first communication system 118a can wirelessly communicate with the second communication system 118b. A well tool component 122 (e.g., a length of tubing or mandrel), a gap, or fluid can be positioned between the first communication system 118a and the second communication system 118b.

The first communication system 118a can and the second communication system 118b can each include an outer toroid antenna and an inner toroid antenna. The outer toroid antenna can be positioned outside of the well tool 114. For example, the inner diameter of the outer toroid antenna can be positioned around the outer circumference of the outer housing of the well tool 114. The inner toroid antenna can be positioned within the well tool 114. For example, the inner diameter of the inner toroid antenna can be positioned around the outer circumference of a mandrel within the well tool 114.

The first communication system 118a and the second communication system 118b can be configured for engaging in short range (e.g., 15.24 m), wireless, electromagnetic communications. In some examples, the inner toroid antenna in the first communication system 118a can transmit data to and receive data from the inner toroid antenna in the second communication system 118b. The outer toroid antenna in the first communication system 118a can transmit data to and receive data from the outer toroid antenna in the second communication system 118b.

Figure 2:
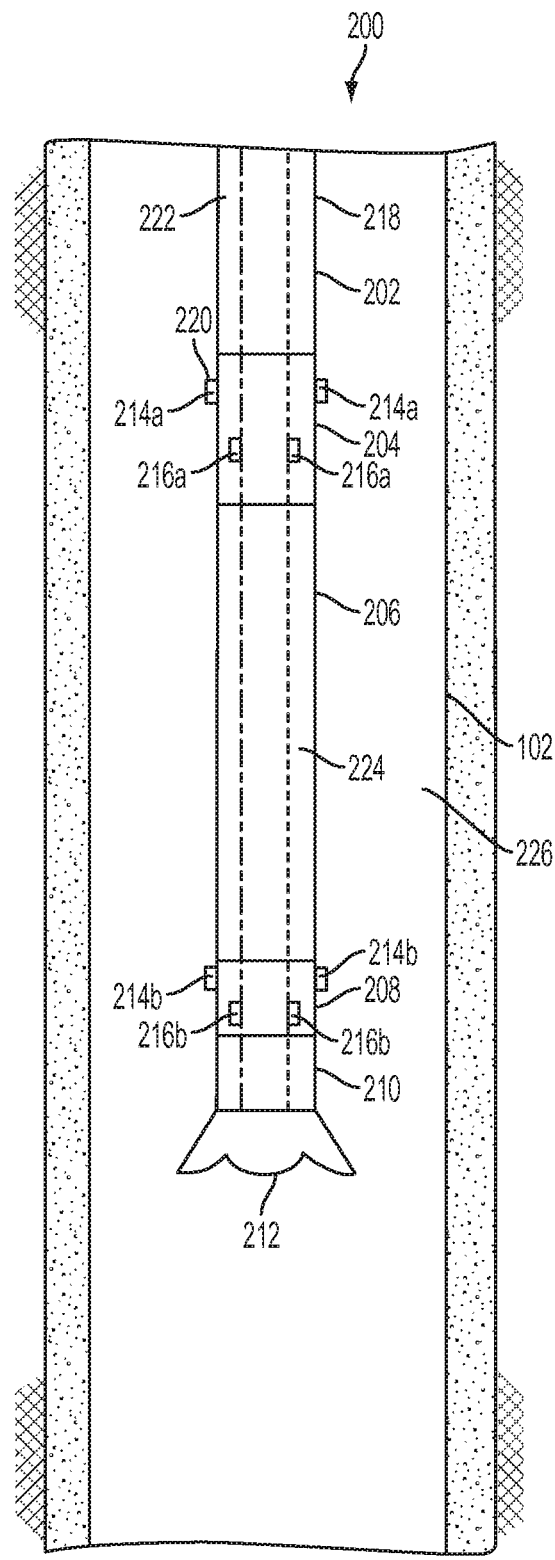
FIG. 2 is a cross-sectional view of another example of a well system that includes a system for high-efficiency downhole wireless communication.

FIG. 2 is a cross-sectional view of another example of a well system 200 that includes a system for high-efficiency downhole wireless communication. In this example, the well system 200 includes a wellbore 102. A well tool 202 (e.g., logging-while-drilling tool) can be positioned in the wellbore 102. The well tool 202 can include various modules 204, 208, 210. For example, the well tool 202 can include a first sub 204 (e.g., a communication sub). The well tool 202 can also include a second sub 208 (e.g., a second communication sub). A tubular section or a third sub 206 (e.g., a mud motor, a rotary steerable tool, or measuring-while-drilling module) can be positioned between the first sub 204 and the second sub 208. In some examples, the well tool 202 can include a drill bit 212 for drilling the wellbore 102. The drill bit 212 can be coupled to a fourth sub 210 (e.g., a tubular section, a measuring-while-drilling module, or a rotary steerable system). The fourth sub 210 can be coupled to the second sub 208.

The well tool 202 can include a first communication system. The first communication system can include an outer toroid antenna 214a and an inner toroid antenna 216a. The first communication system can be coupled to the first sub 204. The well tool 202 can include also include a second communication system. The second communication system can include an outer toroid antenna 214b and an inner toroid antenna 216b. The second communication system can be coupled to the second sub 208.

Figure 3:
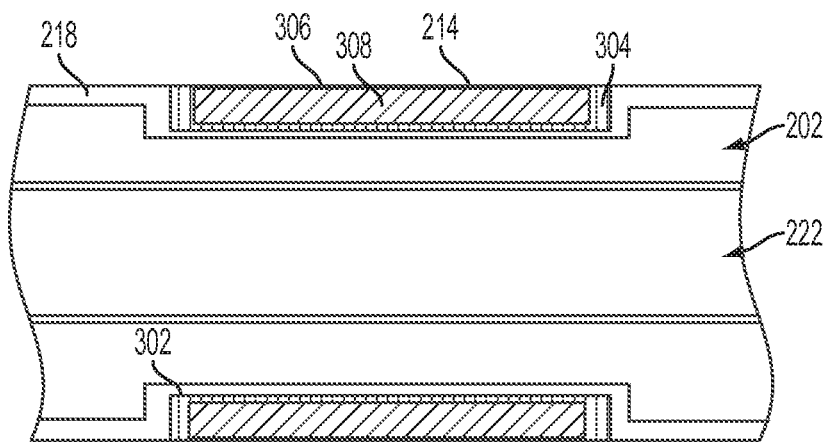
FIG. 3 is a cross-sectional side view of an outer toroid antenna for use in high-efficiency downhole wireless communication.

The outer toroid antennas 214a-b can be positioned on the outer housing 218 of the well tool 202. For example, inner diameter of the outer toroid antennas 214a-b can be positioned coaxially around an outer circumference of the outer housing 218 of the well tool 202. In some examples, the outer toroid antennas 214a-b can be partially embedded in the outer housing 218 of the well tool 202. For example, as shown in FIG. 3, the outer housing 218 of the well tool 202 can include a recessed area 302. An outer toroid antenna 214 can be positioned within the recessed area 302. The outer toroid antenna 214 can include a conductor 306 (e.g., a wire coil) positioned around (e.g., wrapped around) a core 308 (e.g., a magnetic core). In some examples, an insulator 304 can be positioned within the recessed area 302 and between the outer housing 218 and the toroid antenna 214. This can prevent the toroid antenna 214 from directly electrically communicating with the outer housing 218.

The inner toroid antennas 216a-b can be positioned within well tool 202. For example, the inner toroid antennas 216a-b can be coupled to an inner mandrel 222 that is positioned within the outer housing 218 of the well tool 202. In some examples, the inner diameter of the inner toroid antennas 216a-b can be positioned around the outer circumference of an inner mandrel 222. Fluid can flow through the inner mandrel 222.

In some examples, because the outer toroid antennas 214a-b can fit around a larger circumference (e.g., the circumference of the outer housing 218 of the well tool 202) than the inner toroid antennas 216a-b, the outer toroid antennas 214a-b to include cores with larger diameters than the cores of an inner toroid antennas 216a-b. The number of conductive coils (e.g., wire coils) around the cores of the outer toroid antennas 214a-b can be the same as or different from the number of conductive coils around the cores of the inner toroid antennas 216a-b. The thickness of the cores in the outer toroid antennas 214a-b can be the same as or different from the thickness of the cores in the inner toroid antennas 216a-b.

Each of the outer toroid antennas 214a-b can include a housing 220. In some examples, the housing 220 can include a sleeve or sheet that can fully or partially enclose the outer toroid antennas 214a-b within the outer housing 218 of the well tool 202 (e.g., within a recessed area 302 of the outer housing 218, as shown in FIG. 3). The housing 220 can protect the outer toroid antennas 214a-b from being damaged. For example, the housing 220 can protect the outer toroid antennas 214a-b from the effects of corrosion, high pressures, and high temperatures. The housing 220 can also protect the outer toroid antennas 214a-b against impacts (e.g., with the wall of the wellbore 102 or another well tool). The housing 220 can include any suitable insulative material, such as ceramic, plastic, or rubber.

The first communication system can be in bilateral communication with the second communication system. For example, the first communication system can transmit data via the outer toroid antenna 214a to the outer toroid antenna 214b in the second communication system. The first communication system can substantially simultaneously receive data via the outer toroid antenna 214a from the outer toroid antenna 214b in the second communication system. As another example, the first communication system can transmit data via the inner toroid antenna 216a to inner toroid antenna 216b in the second communication system. The first communication system can simultaneously receive data via inner toroid antenna 216a from the inner toroid antenna 216b in the second communication system. In this manner, the first communication system can bilaterally communicate with the second communication system while using the outer toroid antennas 214a-b, the inner toroid antennas 216a-b, or both for communication.

Figure 4:
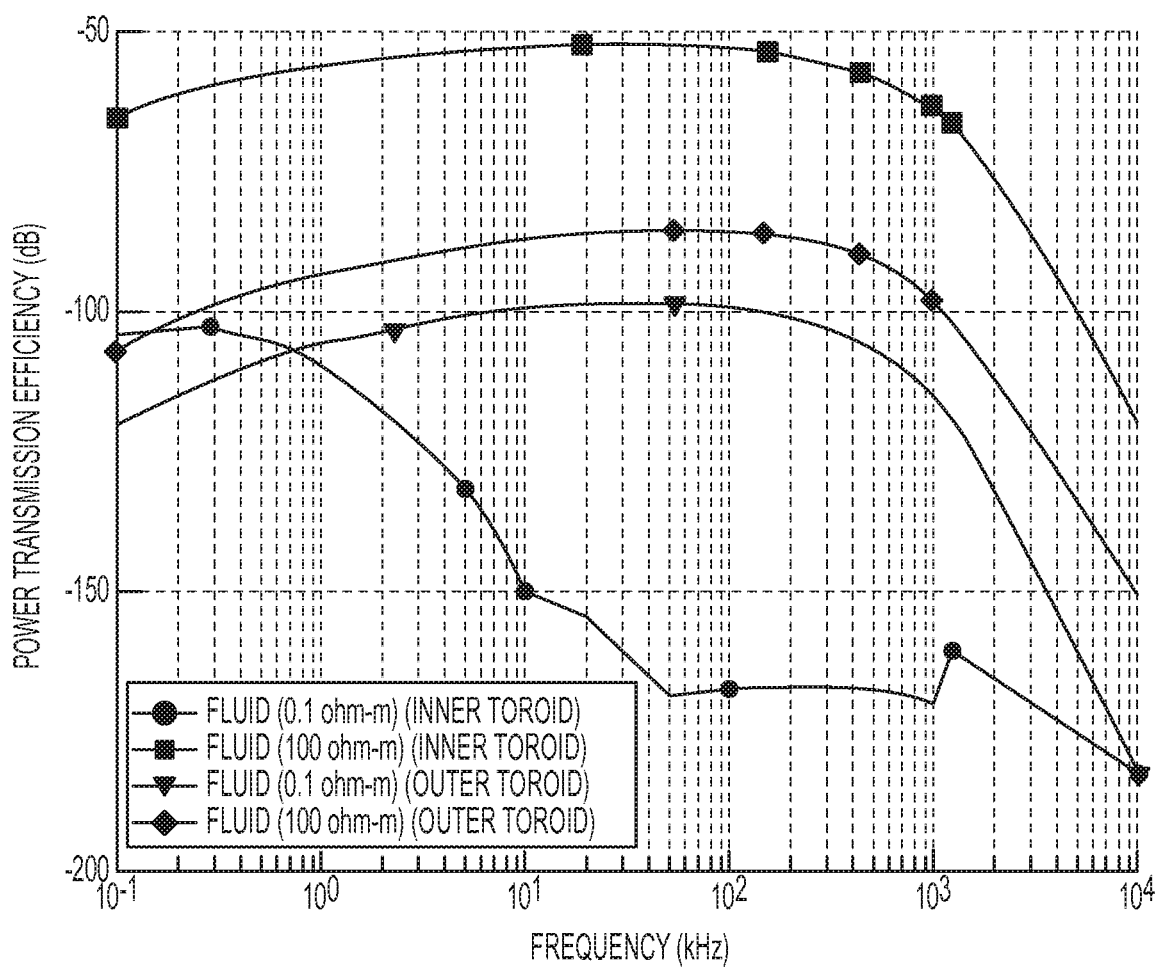
FIG. 4 is a graph depicting an example of power transmission efficiencies using inner toroid antennas and outer toroid antennas.

In some examples, the inner toroid antennas 216a-b can communicate with each other via the inner mandrel 222 and the outer housing 218 of the well tool 202. This can create a closed communication loop. For example, the inner toroid antenna 216a can transmit a signal through the inner mandrel 222 to the inner toroid antenna 216b. The inner toroid antenna 216b can transmit a signal to the inner toroid antenna 216a via the outer housing 202 of the well tool 202. The closed communication loop can provide high power transmission efficiency (e.g., −50 dB as shown in FIG. 4) when a fluid in the space 224 (e.g., an annulus) between the outer housing 218 and the inner mandrel 222 has a high resistivity (e.g., 100 ohm-m). In some examples, the fluid in the space 224 can have a low resistivity (e.g., 0.1 ohm-m). This can cause an electrical short between the inner toroid antennas 216a-b, which can reduce the power transmission efficiency of the communication system (e.g., as described in further detail with respect to FIG. 4). In some examples, responsive to the reduction in power transmission efficiency, the first communication system and the second communication system may switch from communicating via the inner toroid antennas 216a-b to communicating via the outer toroid antennas 214a-b. This can improve the power transmission efficiency of the communication systems.

In some examples, the outer toroid antennas 214a-b can communicate with each other via the outer housing 218 of the well tool 202, a fluid within a space 226 (e.g., an annulus) between the outer housing 218 of the well tool 202 and a wall of the wellbore 102, and/or via the subterranean formation. This can provide a medium power transmission efficiency (e.g., −90 to −100 dB as shown in FIG. 4) when the fluid has either a high resistivity or a low resistivity. In some examples, responsive to the resistivity of the fluid changing to having a high resistivity, the first communication system and the second communication system may switch from communicating via the outer toroid antennas 214a-b to communicating via the inner toroid antennas 216a-b. This can improve the power transmission efficiency of the communication systems.

FIG. 4 is a graph depicting an example of power transmission efficiencies using inner toroid antennas and outer toroid antennas. In some examples, the inner toroid antennas and the outer toroid antennas can transmit data and receive data using frequencies between 100 Hz and 1 MHz. For simplicity, the following discussion will be based on a 10 KHz transmission frequency.

The inner toroid antennas can have a high power transmission efficiency (e.g., −52 dB) when a fluid in the wellbore has a high resistivity (e.g., 100 ohm-m). The first communication system and second communication system may communicate using their inner toroid antennas when the fluid has a high resistivity to maximize power transmission efficiency. The inner toroid antennas can, however, have a low power transmission efficiency (e.g., −150 db) when the fluid has a low resistivity (e.g., less than 0.5 ohm-m). Conversely, the outer toroid antennas can have a medium power transmission efficiency (e.g., −100 dB) when the fluid has a low resistivity. The first communication system and second communication system may switch to communicating using their outer toroid antennas when the fluid has a low resistivity. This can improve the power transmission efficiency (e.g., by 50 dB).

In some examples, while communicating using the outer toroid antennas, the first communication system and second communication system may detect a change in power transmission efficiency in an amount over a threshold. For example, the outer toroid antennas can have a medium power transmission efficiency (e.g., −100 dB) when the fluid has a low resistivity. The outer toroid antennas can have a higher power transmission efficiency (e.g., −85 dB) when the fluid has a high resistivity. If the resistivity of the fluid changes from a low resistivity to a high resistivity, the first communication system and second communication system can detect the change (e.g., 15 dB) in power transmission efficiency. Based on the detected change, the first communication system and second communication system may switch to communicating using the inner toroid antennas. This can improve the power transmission efficiency (e.g., by 33 dB).

By switching between the inner toroid antennas and the outer toroid antennas to accommodate changes in fluid resistivity, the first communication system and the second communication system can improve their power transmission efficiencies. Similar methods can be applied to accommodate for changes in formation conductivity to improve the power transmission efficiency of the first communication system and the second communication system.

Figure 5:
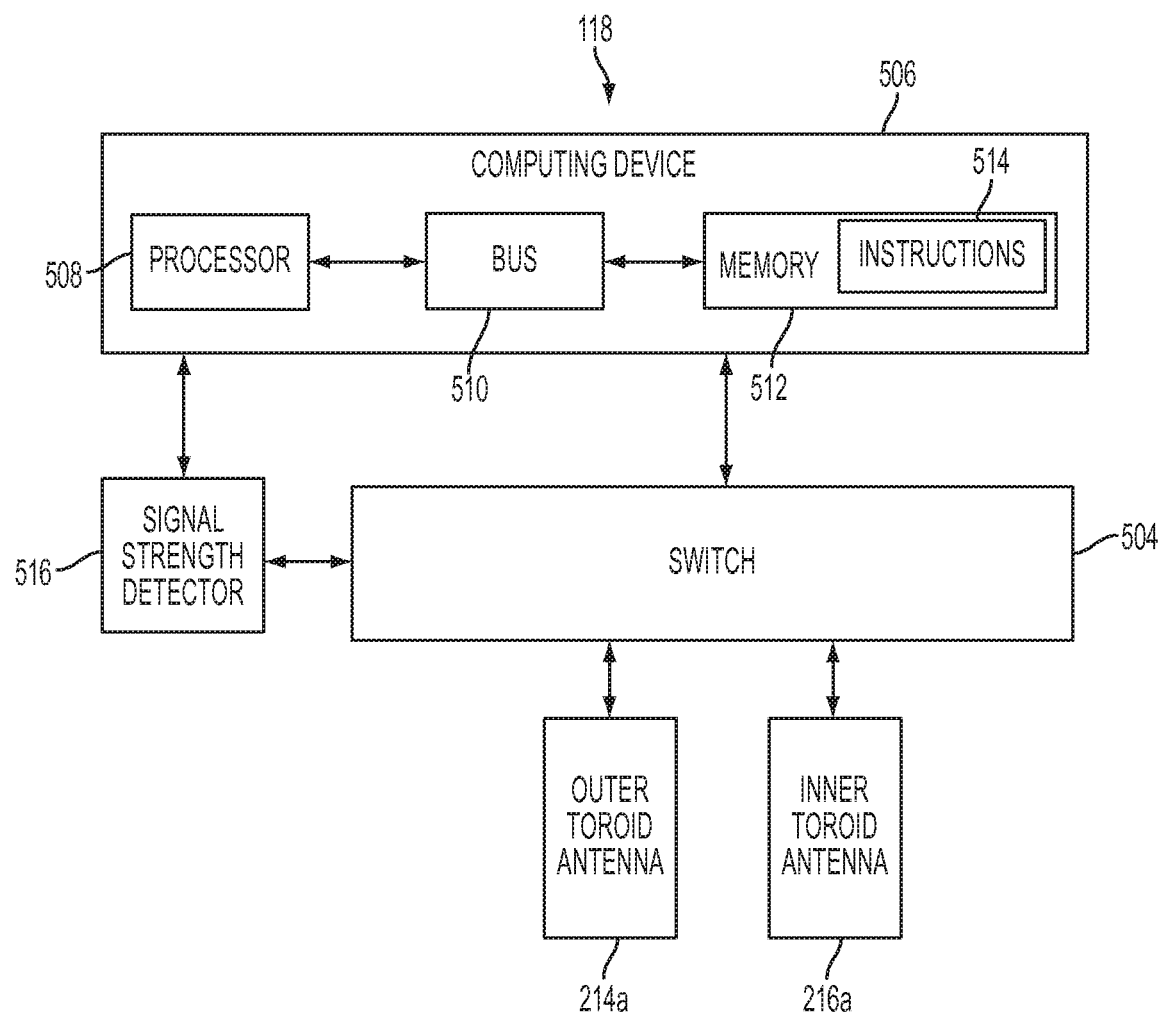
FIG. 5 is a block diagram of an example of a communication system for use in high-efficiency downhole wireless communication.

FIG. 5 is a block diagram of an example of a communication system 118 for use in high-efficiency downhole wireless communication. In some examples, the components shown in FIG. 4 (e.g., computing device 506, signal strength detector 516, switch 504, outer toroid antenna 214a, and inner toroid antenna 216a) can be integrated into a single structure. For example, the components can be within a single housing. In other examples, the components shown in FIG. 5 can be distributed (e.g., in separate housings) and in electrical communication with each other.

The communication system 118 can include an outer toroid antenna 214a and an inner toroid antenna 216a. The outer toroid antenna 214a and the inner toroid antenna 216a can be coupled to a switch 504. The switch 504 can enable or disable communications using the outer toroid antenna 214a and the inner toroid antenna 216a. For example, the switch 504 can enable communications via the inner toroid antenna 216a and disable communications via the outer toroid antenna 214a. In some examples, the switch 504 can allow communications using both of the toroid antennas simultaneously (e.g., the inner toroid antenna 216a and the outer toroid antenna 214a).

The communication system 118 can include signal strength detector 516. The signal strength detector 516 can detect a characteristic (e.g., a voltage, current, or power) of a transmission signal received by a toroid antenna. In some examples, the signal strength detector 516 can operate the switch 504 based on the detected characteristic. For example, if the signal strength detector 516 detects that a transmission signal received by an inner toroid antenna 216a has a voltage below a threshold (e.g., below 200 nV or, if converted to decibels, 50 dB below a baseline decibel level), the signal strength detector 516 can cause the switch 504 to disable communications via the inner toroid antenna 216a and enable communications via the outer toroid antenna 214a. In other examples, the signal strength detector 516 can transmit a signal associated with the detected characteristic to the computing device 506. The signal strength detector 516 can include one or more resistors, capacitors, inductors, comparators, operational amplifiers, relays, transistors, switches, and filters.

The communication system 118 can include a computing device 506. The computing device 506 can receive a signal from the signal strength detector 516. In some examples, the computing device 506 can operate the switch 504 based on the signal from the signal strength detector 516. For example, the signal strength detector 516 can detect the voltage of a transmission received by the outer toroid antenna 214a and transmit an associated signal to the computing device 506. Based on the signal, the computing device 506 can determine if the voltage is over a threshold. If the voltage is over the threshold, the computing device 506 can cause the switch 504 to disable communications via the outer toroid antenna 214a and enable communications via the inner toroid antenna 216a.

In some examples, the computing device 506 can receive a transmission signal from another communication system 118 via a toroid antenna. The computing device 506 can determine one or more characteristics (e.g., amplitude, frequency, duration, or waveform) associated with the transmission signal. In some examples, the computing device 506 can determine a response based on the characteristics. For example, the computing device 506 can determine a response based on an amplitude and frequency associated with the transmission signal. The computing device 506 can generate and transmit a response signal to a toroid antenna (e.g., outer toroid antenna 214a), which can wirelessly communicate the response signal to another communication system 118. In this manner, the computing device 506 may receive, analyze, and respond to transmissions from another communication system 118.

The computing device 506 can include a processor 508, a memory 512, and a bus 510. The processor 508 can execute one or more operations for performing high-efficiency downhole wireless communications. The processor 508 can execute instructions 514 stored in the memory 512 to perform the operations. The processor 508 can include one processing device or multiple processing devices. Non-limiting examples of the processor 508 include a Field-Programmable Gate Array ("FPGA"), an application-specific integrated circuit ("ASIC"), a microprocessor, etc.

The processor 508 can be communicatively coupled to the memory 512 via the bus 510. The non-volatile memory 512 may include any type of memory device that retains stored information when powered off. Non-limiting examples of the memory 512 include electrically erasable and programmable read-only memory ("EEPROM"), flash memory, or any other type of non-volatile memory. In some examples, at least some of the memory 512 can include a medium from which the processor 508 can read the instructions 514. A computer-readable medium can include electronic, optical, magnetic, or other storage devices capable of providing the processor 508 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C #, etc.

In some examples, the communication system 118 can include other components. For example, the communication system 118 can include an AC signal generator configured to generate transmission signals or otherwise facilitate communications. As another example, the communication system 118 can include a battery (e.g. for power). In some examples, the communication system 118 can be coupled to and powered by an electrical cable (e.g., a wireline).

Figure 6:
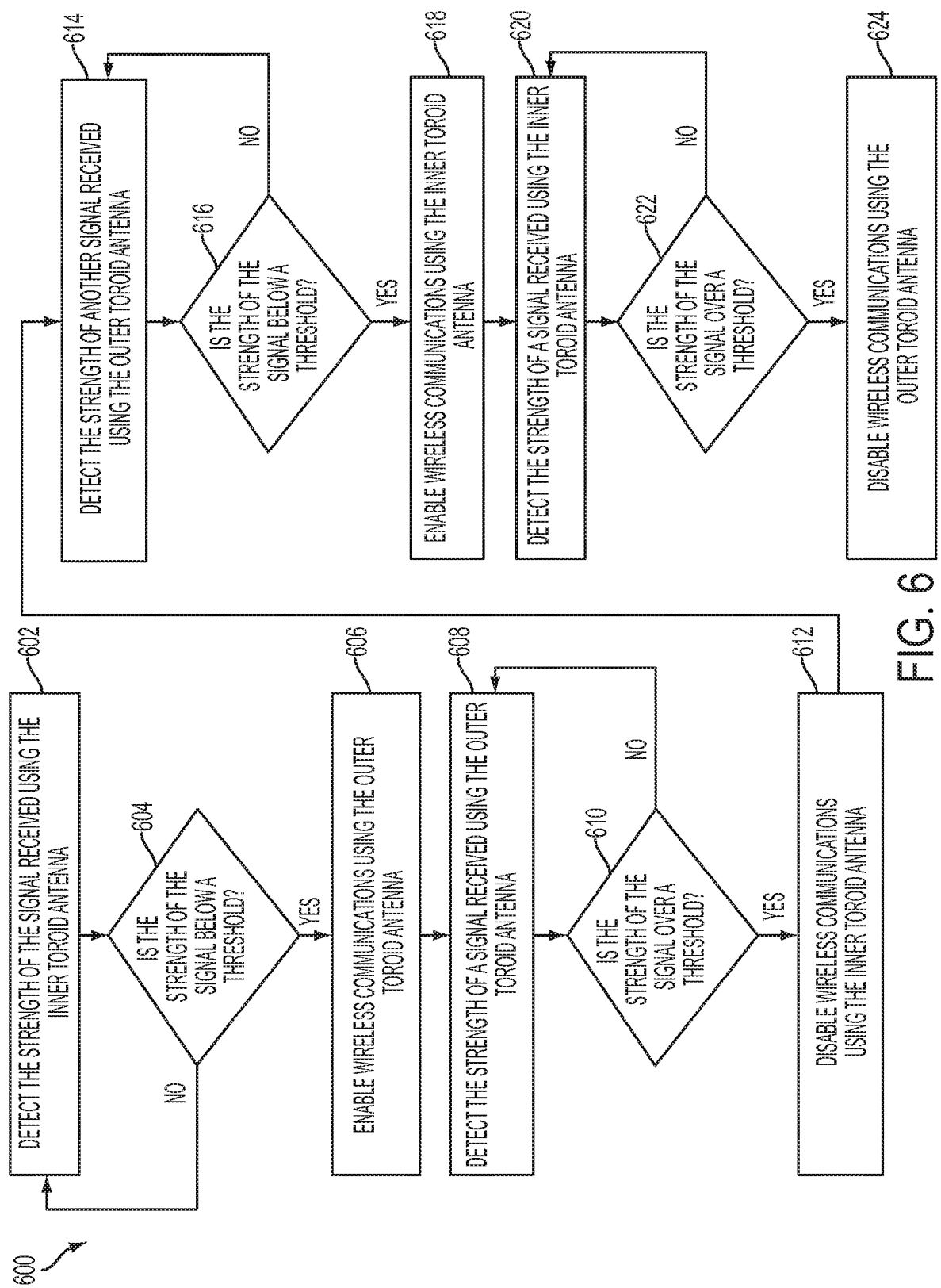
FIG. 6 is a flow chart showing an example of a process for high-efficiency downhole wireless communication according to one example.

FIG. 6 is a flow chart showing an example of a process 600 for high-efficiency downhole wireless communication according to one example. The process 600 below is described with reference to the components describe above with regard to communication system 118 shown in FIG. 5.

In block 602, a communication system 118 detects the strength (e.g., voltage, current, or power) of a signal received using the inner toroid antenna 216a. For example, the signal strength detector 516 can receive the signal from an inner toroid antenna 216a and determine an amount of voltage associated with the first signal.

In block 604, the communication system 118 determines if the strength of the signal is below a threshold. For example, the signal strength detector 516 can detect if the voltage of the signal is below a threshold (e.g., 200 nV or −120 dB). In other examples, the signal strength detector 516 can transmit data associated with the strength of the signal to a computing device 506, The computing device 506 can receive the data and, based on the data, determine if the strength of the signal is below a threshold.

If the strength of the signal is not below the threshold, the process 600 can return to block 602. If the strength of the signal is below the threshold, the process 600 can continue to block 606.

In block 606, the communication system 118 can enable wireless communications using the outer toroid antenna 214a. For example, the switch 504 can electrically connect the outer toroid antenna 214a to one or more other components of the communication system 118 (e.g., the signal strength detector 516, the computing device 506, and a signal source). This can allow wireless communications to be received by and transmitted via both the inner toroid antenna 216a and the outer toroid antenna 214a. Wirelessly communicating using both the inner toroid antenna 216a and the outer toroid antenna 214a can provide redundancy. The redundancy can reduce the effects of errors in one or more wireless communications received via the inner toroid antenna 216a and/or the outer toroid antenna 214a. The redundancy can also help ensure that, when transitioning from the inner toroid antenna 216a to the outer toroid antenna 214a, wireless communications using the outer toroid antenna 214a are stable before disabling wireless communications using the inner toroid antenna 216a.

In block 608, the communication system 118 detects the strength (e.g., voltage, current, or power) of a signal received using the outer toroid antenna 214a. For example, the signal strength detector 516 can receive the signal from the outer toroid antenna 214a and determine an amount of voltage associated with the signal.

In block 610, the communication system 118 determines if the strength of the signal from the outer toroid antenna 214a is over a threshold. For example, the signal strength detector 516 can detect if the strength of the signal is over a threshold (e.g., 2 dB above a threshold). In other examples, the signal strength detector 516 can transmit data associated with the strength of the signal to a computing device 506. The computing device 506 can receive the data and, based on the data, determine if the strength of the signal is over a threshold.

If the strength of the signal from the outer toroid antenna 214a is not over the threshold, the process 600 can return to block 608. If the strength of the signal is over the threshold, the process 600 can continue to block 612.

In block 612, the communication system 118 disables wireless communications using the inner toroid antenna 216a. For example, the switch 504 can electrically disconnect the inner toroid antenna 216a from one or more other components of the communication system 118 (e.g., signal strength detector 516, computing device 506, and a signal source). This can prevent wireless communications from be received by and transmitted via the inner toroid antenna 216a.

In block 614, the communication system 118 detects the strength of another signal received using the outer toroid antenna 214a. For example, the signal strength detector 516 can receive the signal from the outer toroid antenna 214a and determine an amount of voltage associated with the signal.

In block 616, the communication system 118 determines if the strength of the signal from the outer toroid antenna 214a is below a threshold. For example, the signal strength detector 516 can detect if the strength of the signal is below a threshold (e.g., signal strength is below −100 dB). In other examples, the signal strength detector 516 can transmit data associated with the strength of the signal to a computing device 506. The computing device 506 can receive the data and, based on the data, determine if the strength of the signal is over a threshold.

If the strength of the signal from the outer toroid antenna 214a is not below the threshold, the process 600 can return to block 614. If the strength of the signal is below the threshold, the process 600 can continue to block 618.

In block 618, the communication system 118 can enable wireless communications using the inner toroid antenna 216a. For example, the switch 504 can electrically connect the inner toroid antenna 216a to one or more other components of the communication system 118 (e.g., the signal strength detector 516, the computing device 506, and a signal source). This can allow wireless communications to be received by and transmitted via the inner toroid antenna 216a. Wirelessly communicating using both the inner toroid antenna 216a and the outer toroid antenna 214a can provide redundancy. The redundancy can reduce the effects of errors in one or more wireless communications received via the inner toroid antenna 216a and/or the outer toroid antenna 214a. The redundancy can also help ensure that, when transitioning from the outer toroid antenna 214a to the inner toroid antenna 216a, wireless communications using the inner toroid antenna 216a are stable before disabling wireless communications using the outer toroid antenna 214a.

In block 620, the communication system 118 detects the strength of a signal received using the inner toroid antenna 216a. For example, the signal strength detector 516 can receive the signal from the inner toroid antenna 216a and determine an amount of voltage associated with the signal.

In block 622, the communication system 118 determines if the strength of the signal from the inner toroid antenna 216a is over a threshold. For example, the signal strength detector 516 can detect if the strength of the signal is over a threshold (e.g., 2 dB above a threshold).

If the strength of the signal from the inner toroid antenna 216a is not over the threshold, the process 600 can return to block 620. If the strength of the signal is over the threshold, the process 600 can continue to block 624.

In block 624, the communication system 118 disables wireless communications using the outer toroid antenna 214a. For example, the switch 504 can electrically disconnect the outer toroid antenna 214a from one or more other components of the communication system 118 (e.g., signal strength detector 516, computing device 506, and a signal source). This can prevent wireless communications from be received by and transmitted via the outer toroid antenna 214a.

In some examples, the process 600 can return to step 602. Using the process 600 described above, the communication system 118 can wirelessly communicate using the inner toroid antenna 216a, the outer toroid antenna 214a, or both. In some examples, during the transition period between using the inner toroid antenna 216 and using the outer toroid antenna 214a, the communication system 118 can use both the inner toroid antenna 216 and the outer toroid antenna 214a for wirelessly communications. This can provide redundancy to minimize errors and improve the stability of the communication system 118.

In some aspects, high-efficiency downhole wireless communication is provided according to one or more of the following examples:

Example #1

A communication system for use with a well tool can include an outer toroid antenna. The outer toroid antenna can be disposed around an outer housing of the well tool. The communication system can also include an inner toroid antenna. The inner toroid antenna can be disposed within the outer housing of the well tool. The communication system can further include a switch coupled to the outer toroid antenna and the inner toroid antenna. The switch can be operable to enable or disable a wireless communication via the outer toroid antenna or the inner toroid antenna.

Example #2

The communication system of Example #1 may feature the inner toroid antenna being positioned around a mandrel positioned within the outer housing of the well tool.

Example #3

The communication system of any of Examples #1-2 may feature the well tool including at least one of a mud motor and a rotary steerable tool.

Example #4

The communication system of any of Examples #1-3 may feature the switch being operable to enable the wireless communication via the outer toroid antenna based on a resistivity of a fluid in a wellbore.

Example #5

The communication system of any of Examples #1-4 may feature the switch being operable to enable the wireless communication via the outer toroid antenna responsive to a resistivity of a fluid in a wellbore being less than a first threshold.

Example #6

The communication system of any of Examples #1-5 may feature the switch being operable to enable the wireless communication via the inner toroid antenna responsive to the resistivity of a fluid in a wellbore exceeding a second threshold.

Example #7

The communication system of any of Examples #1-6 may feature a voltage detector coupled to the outer toroid antenna and the inner toroid antenna. The voltage detector can be operable to determine a voltage associated with the wireless communication.

Example #8

The communication system of any of Examples #1-7 may feature the switch being operable to enable the wireless communication via the outer toroid antenna responsive to a voltage being below a first threshold.

Example #9

The communication system of any of Examples #1-8 may feature the switch being operable to enable the wireless communication via the inner toroid antenna responsive to a voltage exceeding a second threshold.

Example #10

The communication system of any of Examples #1-9 may feature the outer toroid antenna being positioned within a housing operable to protect the outer toroid antenna from damage.

Example #11

A system can include a switch coupled to an outer toroid antenna. The outer toroid antenna can be disposed around an outer housing of a well tool. The switch can also be coupled to an inner toroid antenna. The inner toroid antenna can be disposed within the outer housing of the well tool. The switch can be operable to enable or disable a wireless communication via the outer toroid antenna or the inner toroid antenna.

Example #12

The system of Example #11 may feature the switch being operable to enable the wireless communication via the outer toroid antenna based on a resistivity of a fluid in a wellbore.

Example #13

The system of any of Examples #11-12 may feature the switch being operable to enable the wireless communication via the outer toroid antenna responsive to the resistivity being less than a threshold.

Example #14

The system of any of Examples #11-13 may feature the switch being operable to enable the wireless communication via the inner toroid antenna responsive to the resistivity exceeding the threshold.

Example #15

The system of any of Examples #11-14 may feature a voltage detector being coupled to the outer toroid antenna and the inner toroid antenna. The voltage detector can be operable to determine a voltage associated with the wireless communication.

Example #16

The system of any of Examples #11-15 may feature the switch being operable to enable the wireless communication via the outer toroid antenna responsive to the voltage being below a threshold. The switch may also be operable to enable the wireless communication via the inner toroid antenna responsive to the voltage exceeding the threshold.

Example #17

The system of any of Examples #11-16 may feature the well tool including at least one of a mud motor and a rotary steerable tool.

Example #18

The system of any of Examples #11-17 may feature the outer toroid antenna being positioned within a housing operable to protect the outer toroid antenna from damage.

Example #19

A method can include receiving a signal via an inner toroid antenna. The inner toroid antenna can be disposed within an outer housing of a well tool. The method can also include detecting a signal strength associated with the signal. The method can further include determining if the signal strength is below a threshold. The method can also include, responsive to the signal strength being below the threshold, operating a switch to disable a wireless communication via the inner toroid antenna and enable the wireless communication via an outer toroid antenna disposed around the outer housing of the well tool.

Example #20

The method of Example #19 may feature, responsive to the signal strength being below the threshold, operating the switch to enable the wireless communication via both the inner toroid antenna and the outer toroid antenna. The method can also include receiving a second signal via the outer toroid antenna and detecting a second signal strength associated with the second signal. The method can further include, responsive to the second signal strength exceeding a second threshold, operating the switch to disable the wireless communication via the inner toroid antenna.

Example #21

The method of any of Examples #19-20 may feature receiving a third signal via the outer toroid antenna. The method can also include detecting a third signal strength associated with the third signal. The method can further include determining if the third signal strength is over a third threshold. The method can also include, responsive to the third signal strength exceeding the third threshold, operating the switch to disable the wireless communication via the outer toroid antenna and enable the wireless communication via the inner toroid antenna.

Example #22

The method of any of Examples #19-21 may feature, responsive to a third signal strength being below the threshold, operating the switch to enable the wireless communication via both the inner toroid antenna and the outer toroid antenna. The method can also include receiving a fourth signal via the inner toroid antenna and detecting a fourth signal strength associated with the fourth signal. The method can further include, responsive to the fourth signal strength exceeding a second threshold, operating the switch to disable the wireless communication via the outer toroid antenna.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A communication system for use with a well tool, the communication system comprising:
   an outer toroid antenna that is disposed around an outer housing of the well tool;
   an inner toroid antenna that is disposed within the outer housing of the well tool;
   a processor; and
   a memory including instructions executable by the processor for causing the processor to:
      receive a signal from the inner toroid antenna that is disposed within the outer housing of the well tool;
      detect a signal strength associated with the signal;
      determining if the signal strength is below a threshold; and
      responsive to the signal strength being below the threshold, operate a switch to disable a wireless communication via the inner toroid antenna and enable the wireless communication via the outer toroid antenna disposed around the outer housing of the well tool.

2. The communication system of claim 1, wherein the inner toroid antenna is positioned around a mandrel positioned within the outer housing of the well tool.

3. The communication system of claim 1, wherein the well tool comprises at least one of a mud motor and a rotary steerable tool.

4. The communication system of claim 1, wherein the memory further comprises instructions that are executable by the processor for causing the processor to operate the switch to enable the wireless communication via the outer toroid antenna based on a resistivity of a fluid in a wellbore.

5. The communication system of claim 4, wherein the memory further comprises instructions that are executable by the processor for causing the processor to operate the switch to enable the wireless communication via the outer toroid antenna based on the resistivity being less than a first threshold.

6. The communication system of claim 5, wherein the memory further comprises instructions that are executable by the processor for causing the processor to operate the switch to enable the wireless communication via the inner toroid antenna and disable the wireless communication via the outer toroid antenna based on the resistivity exceeding a second threshold.

7. The communication system of claim 1, further comprising a voltage detector coupled to the outer toroid antenna and the inner toroid antenna, the voltage detector operable to determine a voltage associated with the wireless communication.

8. The communication system of claim 7, wherein the memory further comprises instructions that are executable by the processor for causing the processor to operate the switch to enable the wireless communication via the outer toroid antenna based on the voltage being below a first threshold.

9. The communication system of claim 8, wherein the memory further comprises instructions that are executable by the processor for causing the processor to operate the switch to enable the wireless communication via the inner toroid antenna based on the voltage exceeding a second threshold.

10. The communication system of claim 1, wherein the outer toroid antenna is positioned within a housing operable to protect the outer toroid antenna from damage.

11. A system comprising:
    a processor;
    a memory including instructions executable by the processor for causing the processor to:
       receive a signal from an inner toroid antenna that is disposed within an outer housing of a well tool;
       detect a signal strength associated with the signal;
       determining if the signal strength is below a threshold; and
       responsive to the signal strength being below the threshold, operate a switch to disable a wireless communication via the inner toroid antenna and enable the wireless communication via an outer toroid antenna disposed around the outer housing of the well tool; and
    the switch, wherein the switch is coupled to the inner toroid antenna and the outer toroid antenna, the switch being operable to enable or disable the wireless communication via the outer toroid antenna or the inner toroid antenna.

12. The system of claim 11, wherein the memory further comprises instructions that are executable by the processor for causing the processor to operate the switch to enable the wireless communication via the outer toroid antenna based on a resistivity of a fluid in a wellbore.

13. The system of claim 12, wherein the memory further comprises instructions that are executable by the processor for causing the processor to operate the switch to enable the wireless communication via the outer toroid antenna based on the resistivity being less than a resistivity threshold.

14. The system of claim 13, wherein the memory further comprises instructions that are executable by the processor for causing the processor to operate the switch to enable the wireless communication via the inner toroid antenna based on the resistivity exceeding the resistivity threshold.

15. The system of claim 11, wherein a voltage detector is coupled to the outer toroid antenna and the inner toroid antenna, the voltage detector operable to determine a voltage associated with the wireless communication.

16. The system of claim 15, wherein the memory further comprises instructions that are executable by the processor for causing the processor to enable the wireless communication via the outer toroid antenna responsive to the voltage being below a voltage threshold, and enable the wireless communication via the inner toroid antenna responsive to the voltage exceeding the voltage threshold.

17. The system of claim 11, wherein the well tool comprises at least one of a mud motor and a rotary steerable tool.

18. The system of claim 11, wherein the outer toroid antenna is positioned within a housing operable to protect the outer toroid antenna from damage.

19. A method comprising:
receiving, by a processor, a signal via an inner toroid antenna disposed within an outer housing of a well tool;
detecting, by the processor, a signal strength associated with the signal;
determining, by the processor, if the signal strength is below a threshold; and
responsive to the signal strength being below the threshold, operating, by the processor, a switch to disable a wireless communication via the inner toroid antenna and enable the wireless communication via an outer toroid antenna disposed around the outer housing of the well tool.

20. The method of claim 19, further comprising executing the following operations responsive to the signal strength being below the threshold:
operating the switch to enable the wireless communication via both the inner toroid antenna and the outer toroid antenna;
receiving a second signal via the outer toroid antenna;
detecting a second signal strength associated with the second signal;
responsive to the second signal strength exceeding a second threshold, operating the switch to disable the wireless communication via the inner toroid antenna.

21. The method of claim 20, further comprising:
receiving a third signal via the outer toroid antenna;
detecting a third signal strength associated with the third signal;
determining if the third signal strength is below a third threshold; and
responsive to the third signal strength being below the third threshold, operating the switch to enable the wireless communication via the inner toroid antenna.

22. The method of claim 21, further comprising:
receiving a fourth signal via the inner toroid antenna;
detecting a fourth signal strength associated with the fourth signal;
responsive to the fourth signal strength exceeding a fourth threshold, operating the switch to disable the wireless communication via the outer toroid antenna.

* * * * *